Oct. 28, 1924.                      1,513,319.
C. A. GODDARD
FASTENER OR GARTER LOOP
Filed April 5, 1923

Inventor
Charles A. Goddard
By his Attorneys
George Cook

Patented Oct. 28, 1924.

1,513,319

UNITED STATES PATENT OFFICE.

CHARLES A. GODDARD, OF CHESHIRE, CONNECTICUT, ASSIGNOR TO THE BALL AND SOCKET MANUFACTURING COMPANY, OF WEST CHESHIRE, CONNECTICUT, A CORPORATION OF CONNECTICUT.

FASTENER OR GARTER LOOP.

Application filed April 5, 1923. Serial No. 629,959.

*To all whom it may concern:*

Be it known that I, CHARLES A. GODDARD, a citizen of the United States, and a resident of Cheshire, in the county of New Haven and State of Connecticut, have made and invented certain new and useful Improvements in Fasteners or Garter Loops, of which the following is a specification.

My invention relates to a loop for garters or fasteners and has for its object to provide a device of this character which will, to a certain extent, be flexible, will be non-corrosive or non-stainable, and so composed that it may partake of any desired color.

A further object is to provide a fastener or garter loop which is of neat and pleasing appearance, is composed of a non-metallic body having nicely rounded and smooth sides so as to prevent any danger of the loop from tearing the garment or hose, and, being formed of non-metallic material, will be unaffected by moisture or water.

A further object is to provide a novel method of manufacturing a garter loop or eye fastener whereby the body of the loop will be composed of non-metallic material, preferably celluloid, and may be produced in large quantities at an exceedingly low cost and without any waste or scrap, and, further, to provide a method of making loops so that the finished product will be strong, durable and rugged in construction, so as to render long and useful service, and so organized and shaped as to be attractive and pleasing in appearance.

With the foregoing and other objects in view, my invention consists in the improved garter loop illustrated in the accompanying drawing and in the method of manufacturing the same as hereinafter described and claimed, and in such variations and modifications thereof as will be obvious to those skilled in the art to which my invention relates, it being understood that changes may be made within the scope of what is claimed without departing from the spirit thereof.

The preferred embodiment of my invention and the method of producing the loop or eye are disclosed in the accompanying drawing, wherein.

Figure 1:
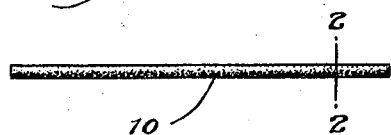
Figure 1 is a view of the rod-like blank from which the loop is made.
Figure 2:
Figure 2 is a cross-section of the same taken on the line 2—2 of Figure 1.
Figure 3:
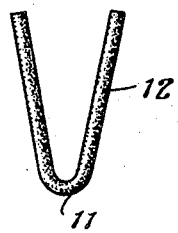
Figure 3 is a plan view showing the partially formed loop after the second operation.

In the manufacture of my novel fastener or garter loop, a round rod of non-metallic material, preferably celluloid, is cut to a predetermined length as illustrated in Figure 1, and which rod-like blank 10 is to subsequently form the body of the garter or fastener loop. This rod-like body 10 is preferably of circular cross section as illustrated in Figure 2, such a rod being a commercial article and accordingly may be obtained in the open market. The non-metallic rod blank is then heated and bent into U-shape around a pin to form the second stage blank illustrated in Figure 3 and comprises the curved front portion 11 and rearwardly projecting arms 12.

Figure 4:
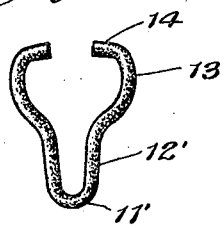
Figure 4 is a plan view showing the rod after the completion of the bending operations.
Figure 5:
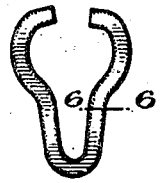
Figure 5 is a view showing the loop after the rod-like material of which it is formed has been flattened.
Figure 6:
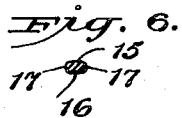
Figure 6 is a section on the line 6—6 of Figure 5.
Figure 9:
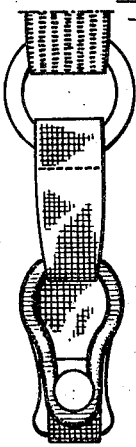
Figure 9 shows the loop as applied to a garter.
Figure 7:
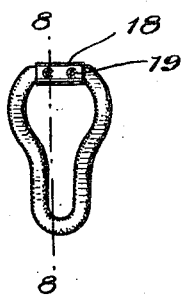
Figure 7 is a plan view of the completed loop after the adjoining ends at the back of the loop have been securely fastened together by a ferrule or sleeve.
Figure 8:
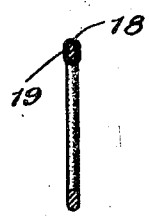
Figure 8 is a view in section taken on the line 8—8 of Figure 7.

The second stage blank, while still in a semi-plastic state, is then bent or formed into the shape disclosed in Figure 4. This then constitutes what I term the third stage blank, the same being of general keyhole shape outline and comprises the curved front end 11', the restricted neck 12', and the enlarged rear portion 13'. The ends 14 of the rod which constitutes the third stage blank extend inwardly and ultimately form the rear crossbar by means of which the loop is secured in place. The third stage blank is then subjected to the action of a suitable press so as to flatten the material of which the blank is formed so as to obtain the fourth stage blank, as illustrated in Figures 5 and 6, and referring particularly to Figure 6 it will be apparent that the rod-like material, preferably of the nature of celluloid, is now composed of the two flat surfaces 15—16 and the nicely rounded sides 17.

The ends 14 are then brought together and a metal ferrule 18 is formed therearound. The ferrule and rod ends therebeneath are then subjected to a stabbing operation which causes small indentations 19 to be formed in the ferrule and the metal of the indentations to flow in similar indentations formed in the rod ends to thereby rigidly lock and bind the ferrule to the rod ends and the rod ends together.

The entire forming operations may be rapidly carried out so that a high production may be economically obtained. Further, particular attention is called to the fact that the rod blank of Figure 1 may be of any desired color, and the round rod of which this first blank is composed insures that the subsequent flattening of the same will not detract from this smooth, round contour. Particular attention is also called to the non-corrosive material of which the loop is formed, so that the garment to which the loop is secured may be readily washed or exposed to water or moisture. Further, the metallic ferrule reinforces the non-metallic body at the point of greatest strains and thereby insures the long and serviceable life of the loop.

Thus my improved garter loop is made without waste or scrap, and, further, the cross section of the material of which the body is formed is smooth and without burs or fins, due to the circular cross section of the original blank. Thus I am able to entirely do away with the objection to celluloid loops as heretofore formed, wherein the loop was stamped from a sheet of celluloid or allied material and considerable scrap or waste thus produced, and, furthermore, it was very difficult to do away with the burrs and fins produced by such stamping operation. Further, the metal ferrule at the back of my loop not only holds the ends of the loop together but also reinforces and strengthens this portion of the loop.

Having thus described and explained my invention, I claim and desire to secure by Letters Patent:

1. A fastener loop comprising a body formed of rod-like celluloid, said body of substantially keyhole-shape outline, and a metal ferrule extending around the ends of the body, said metal ferrule provided with indentations engaging corresponding indentations in the celluloid rod, thereby rigidly locking the ferrule thereto.

2. A fastener loop formed of rod-like celluloid or similar non-metallic material, said rod-like material being bent to form a body having a restricted front portion adapted to receive the material to be fastened therein and further provided with confronting inturned ends at the rear of said body, and a metal ferrule extending around the inturned confronting ends, said ferrule provided with inwardly extending indentations projecting beneath the surface of the said rod-like material and rigidly locking the ferrule thereto.

Signed at Cheshire, in the county of New Haven and State of Connecticut, this 23rd day of March A. D. 1923.

CHARLES A. GODDARD.

Witnesses:
  MILTON W. HALL,
  THERON S. FRENCH.